May 24, 1932.   D. R. DE TAR   1,860,176

INDUCTANCE COIL

Filed April 16, 1929

Inventor:
Donald R. DeTar,
by Charles E. Mullen
His Attorney.

Patented May 24, 1932

1,860,176

UNITED STATES PATENT OFFICE

DONALD R. DE TAR, OF SCHENECTADY, NEW YORK, ASSIGNOR TO GENERAL ELECTRIC COMPANY, A CORPORATION OF NEW YORK

INDUCTANCE COIL

Application filed April 16, 1929. Serial No. 355,574.

The present invention relates to an inductance coil for use in tuned high frequency circuits and more particularly to an inductance coil for use in multiple tuned high frequency circuits, that is, in circuits which are to be tuned simultaneously by a common means such as a gang type of variable condenser, for example.

Multiple tuned circuits are well known in modern single-dial-control radio apparatus. Each of such circuits may include a fixed inductance and a variable capacitance, the fixed inductance being a coil of the single-layer solenoid type, and the capacitance being a section of a single-control gang type variable condenser.

In order that such single control circuits may be tuned simultaneously to the same frequency over a relatively wide range of frequencies, such as the broadcast band for example, both the coils and the condenser sections must be accurately matched to each other. The condenser sections may be matched by precision work in manufacture, as may the coils also, but it is difficult and costly to produce accurately matched coils, because of unavoidable slight differences in the spacing of the turns or unavoidable slight differences in diameter of the forms upon which the coils may be wound. Hence precision work upon the coils for multiple tuned circuits is relatively costly, and furthermore involves the careful testing and adjusting of each coil during manufacture.

It is the object of this invention therefore to provide an improved inductance coil and means for adjusting its inductance, whereby such coil may have any desired degree of accuracy in its inductance value without resorting to precision workmanship in manufacture and the added cost of the latter. A further object is to provide a coil the inductance of which may readily be adjusted at any time to compensate for changes in other circuit constants.

The invention will be better understood from the following description when considered in connection with the accompanying drawings and its scope will be pointed out in the appended claims.

Figure 1:
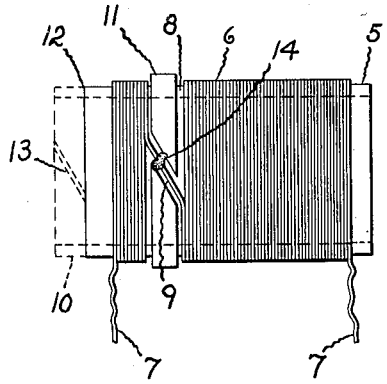
Figure 3:
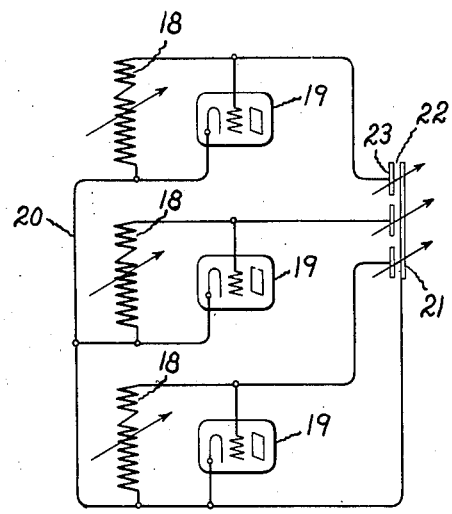
Figure 2:
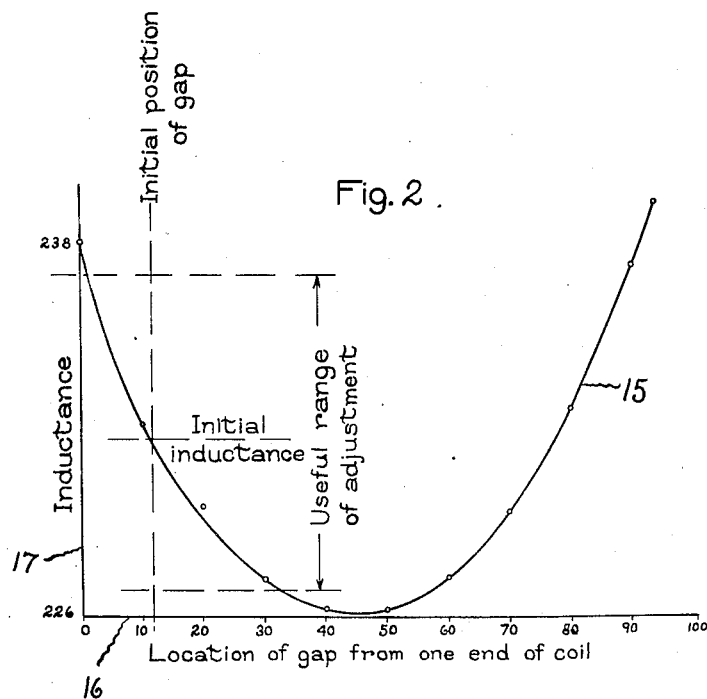

In the drawings, Fig. 1 is a side view of an inductance coil embodying my invention; Fig. 2 is a curve illustrating a characteristic of the coil of Fig. 1; and Fig. 3 is a multiple tuned radio frequency circuit embodying coils constructed in accordance with my invention.

Referring to Fig. 1, 5 is a suitable cylindrical coil form having a desired and preferably substantially uniform diameter and of a length suitable for receiving a solenoid or helical winding forming the coil 6, the terminal ends of which are indicated at 7. The winding is of any suitable conducting wire covered with insulation or spaced upon the form to prevent contact between adjacent turns. The coil is wound or placed upon the form in any suitable manner and in being wound is provided with an axial gap or space 8 along its length, preferably adjacent one end. The gap is of such axial length that it displaces several turns and divides the coil or winding into two sections, as indicated, of unequal length.

The effect of such a gap is to change the inductance of the coil from that which it would have with the turns all in one section, and I have found that by adapting the turns to be transferred from one section to the other to move the gap along the coil, the inductance of the coil may be changed appreciably even though the gap be of an axial length sufficient to displace only a few turns.

The gap is moved along the coil, preferably by placing an instrument against a portion of a cross-over turn 9, which connects the two sections of the coil, and rotating either the coil or the instrument in the proper direction. This serves to progressively transfer the turns from one section to the other. I have found that a convenient, easily constructed and serviceable instrument for this purpose is a section of the coil form 5 itself, as indicated in dotted lines at 10, and as indicated in full at 11, section 10 having been sawed from the coil form at 12, cut diagonally as indicated at 13 corresponding to the diagonal path of the connecting wire or crossover 9.

and slipped upon the coil form within the gap as shown at 11. Thus it resembles a piston ring fitted between the two winding sections. The crossover turn 9 lies in the cut which is widened by the section 10 having been expanded when placed upon the coil form by the difference between its inside and outside diameters.

The axial length of the instrument 11 is such that it substantially fills the gap and upon rotating this instrument with respect to the coil, by holding the one and rotating the other, it is found that the turns may be rapidly transferred from one section to another. When the adjustment is completed the ring may be locked in place with the cross-over turn 9 by any suitable means such as a drop of sealingwax placed in the cut as indicated at 14.

While the coil form has been indicated as a suitable source for material from which to provide the turn-transferring instrument 11, it is obvious that it may be provided from any other source and by any suitable means. It is preferably constructed of insulating material of such quality that it does not introduce appreciable dielectric losses. Likewise, while the coil has been shown as wound upon a hollow tubing, it is obvious that it may be wound upon any cylindrical form of suitable material having substantially a uniform diameter.

In Fig. 2 to which attention is now directed, the manner in which the inductance varies with transfer of turns is shown graphically by a curve 15 plotted from actual measurements between coordinates 16 and 17 as indicated. This curve shows that as the gap is moved along the coil, the inductance decreases as the gap nears the center of the coil and then increases again in a reverse manner as it progresses toward the opposite end of the coil. Thus by moving the gap along the coil from one end to the center a relatively wide range of inductance control is effected, the inductance being maximum with the turns all in one section and a minimum with the turns in two sections of equal size.

It may be said by way of illustration, that with a coil of approximately 93 turns of 10 mil wire, with enamel insulation, wound upon a tube 1 9/32" outside diameter, with a gap of 3/32", the inductance of the coil could be varied from approximately 226 micro-henries to approximately 239 micro-henries. These values are indicated on the curve, the points from which the curve is drawn being taken with the transfer of every ten turns. The curve 15 should be symmetrical about the minimum point, but the slight differences between two sections of the curve may be attributed to the fact that there was a slight space between the turns when the wire was wound originally, while it was close wound after being transferred across the gap.

While more than one gap may be provided, in practice one gap is positioned adjacent one end as shown in Fig. 1, and as indicated in Fig. 2, so that considerable adjustment range is possible in either direction from the initial adjustment indicated in Fig. 2. The wider the gap, the greater the range of adjustment, but the more critical is the adjustment, as the effect of transferring one turn is greater. The width of the gap should be large enough so that he range of adjustment will just compensate for all manufacturing variations, such as diameter of the winding form and diameter and spacing of the winding turns, etc.

Referring now to Fig. 3, a typical multi-tuned high frequency circuit is shown and comprises three inductances of the type shown in Fig. 1 and indicated at 18. Each of the inductances is connected with the control electrode of an electrical discharge device 19 and forms the input or grid circuit for such device. The output circuits of these devices do not concern the invention and are therefore not shown in the figure. Each of the inductances 18 is connected at its low potential end with a common lead 20 and with the rotor 21 of a variable tuning device 22 which in the present example is shown as being a multiple or gang variable condenser. The high potential or grid ends of the inductances are each connected with a separate section or stator 23 of the multiple gang condenser.

With this arrangement when the variable tuning device 22 is operated all of the circuits represented by the inductances 18 and the condenser 22 are tuned to the same frequency when, as in the usual construction, each section of the variable tuning device is a duplicate of the others. Each of the inductances may have a slightly different inductance value from the others when connected in the circuit, and it will be seen that with the adjustment provided by the gap in the windings of the inductances the several inductance values may be adjusted to a common value, as hereinbefore described, and by this means the tuning of the individual circuits may be brought to a resonance at the same frequency.

This is a desirable feature in multi-tuned circuits since precision workmanship is not required in the winding of the inductances or coils and the adjustment may be made or changed at any time to match the particular setting of the variable tuning element used in connection with the inductances.

The invention is not limited to the type of circuit shown in Fig. 3, however, which is shown only by way of example as being typical of multiple tuned high frequency apparatus having a plurality of tuned circuits and a common variable tuning device in connection therewith.

What I claim as new and desire to secure by Letters Patent of the United States, is,—

1. An adjustable inductance comprising a winding arranged in axially spaced sections separated from each other by an annular gap along the length of said winding, said gap being sufficiently wide to change the inductance of the winding by a predetermined substantial amount from that which it would have with the turns all in one section, and means to move the turns of the winding from one section to the other between adjacent ends of said sections.

2. An adjustable inductance comprising a single layer solenoid winding arranged in axially spaced sections, the turns of the winding being progressively movable from one section to the other between adjacent ends of said sections, and means located between said sections and engaging said winding for moving said turns between said sections.

3. An adjustable inductance comprising a single layer solenoid winding arranged in axially spaced sections, the turns of the winding being progressively movable from one section to the other between adjacent ends of said sections, a cylindrical form for supporting and guiding said winding, and means engaging the form and said winding for progressively moving said turns from the one section to the other.

4. An inductance for tuned high frequency circuits and the like, said inductance comprising a solenoid winding having an annular gap along its length, said gap being sufficiently wide to change the inductance of the winding by a predetermined substantial amount from that which it would have with the turns all in one section, and means to move turns of said winding from one side of said gap to the other side thereof to position the gap between one end and the center of the winding, the gap being thereby so positioned between said end and center of the winding that the value of the inductance is of a predetermined value and independent of variations in manufacture.

5. An inductance coil comprising a winding provided with a gap in said winding, said gap being sufficiently wide to change the inductance of said winding by a predetermined substantial amount from that which it would have with said winding all in one section, and means to transfer the turns adjacent said gap across the latter to adjust the inductance of the coil.

6. An inductance coil comprising a solenoid winding having an annular axially extending gap along its length and a connecting turn diagonally crossing said gap, and means for moving said turn to progressively transfer the winding across said gap from one side thereof to the other.

7. An inductance unit including a cylindrical form, an inductance winding on said form, said winding being arranged in axially spaced sections and continuous in the same direction in and between both sections, and means for transferring turns from one section to the other to adjust the inductance of said unit, said means including a ring arranged substantially to fill the space between said sections of the winding and having a cut through said ring for holding a portion of a turn of said winding to be transferred from one section to the other.

8. In a tuned high frequency circuit, an inductance unit including a cylindrical form, an inductance winding on said form, said winding being in axially spaced sections and continuous in the same direction in and between both sections, and means to transfer the turns of said winding along the form from one section to the other to adjust the inductance of said unit.

In witness whereof, I have hereunto set my hand this 15th day of April, 1929.

DONALD R. DE TAR.